UNITED STATES PATENT OFFICE.

ABBOT R. DAVIS, OF BOSTON, MASSACHUSETTS, ASSIGNOR TO FREDERICK J. KALDENBERG, OF NEW YORK, N. Y.

PROCESS OF WORKING AMBER.

SPECIFICATION forming part of Letters Patent No. 234,756, dated November 23, 1880.

Application filed May 22, 1880. (Specimens.)

*To all whom it may concern:*

Be it known that I, ABBOT R. DAVIS, of Boston, in the county of Suffolk and State of Massachusetts, have invented a new Process of Molding or Shaping Amber into Various Forms; and I do hereby declare that the following is a full, clear, and exact description, which will enable others skilled in the art to which it appertains to make and use the same.

In the manufacture of amber—which is used for a great variety of useful and ornamental purposes and is of a very refractory nature—a piece is first selected of suitable size and shape to produce the desired article. The workman then takes it in his hand, resting one end on a suitable block or support, and with a chisel or tool adapted for the purpose cuts or chips it off until it approximates to the desired shape. The article thus formed in the rough is then still further worked and finished by filing, turning, sandpapering, grinding, and polishing. This method of working is, however, slow, tedious, and expensive; and, furthermore, about one-half of the material is wasted, as the pieces of amber in the natural state are of very irregular form, and consequently a piece of double the size of the finished article is often required to produce it, the small pieces chipped or cut off and the filings being of little or no value.

All attempts to melt or fuse amber and then mold it have heretofore resulted in failure, for the reason that the heat required to sufficiently melt or fuse it destroys its essential qualities, by charring or decomposing it, about 440° or more Fahrenheit being required for the purpose, under which degree of heat the amber parts with a portion of its essential oil and succinic acid, and is left in a partly-charred condition and wholly unfit for the purposes for which amber is employed.

My invention has for its object to overcome these difficulties and to render it possible to successfully and cheaply mold amber to any required shape; and it consists in molding it under the application of heat and pressure in a manner which will now be particularly described.

In carrying my invention into effect I employ a suitable mold of a size and shape to form the desired article. This mold, which is of steel or other hard metal, is preferably composed of three or more parts, the main or outer portion forming a casing or receptacle for the upper and lower portions containing the dies, which fit closely within the main portion, and are adapted to move or slide therein. The construction of the mold, however, forms no part of my present invention, and may be varied to suit the requirements of the case. A quantity of small pieces or particles of amber of sufficient bulk to form the article desired is now placed in the mold, which is then heated by means of superheated steam, or in any other suitable manner preferred, until the amber is softened sufficiently to yield under a heavy pressure, which is then gradually applied to the movable portion or portions of the mold while hot, and causes the particles of amber, when in a soft state, to adhere tenaciously together and entirely fill the dies of the mold, thus forming a homogeneous mass, any excess being squeezed or pressed out at the joints between the dies or portions of the mold. The pressure required for this purpose will vary from one thousand to three or four thousand pounds to the square inch, the pressure when applied to the softened amber causing it to gradually yield and extend itself into every part of the dies, so as to form a perfect article, as required.

Great care must be taken that the heat does not exceed the degree required to sufficiently soften the amber, and it must be as much less as possible than that required to fuse or melt it, the proper degree of heat being the minimum which will render it adhesive and sufficiently soft to yield, as required, under the pressure applied.

When an article is to be molded from a single piece of amber instead of from a number of small pieces, a less degree of heat will be required, as the amber will yield and under the gradual pressure applied extend itself into all portions of the mold under a degree of heat which would be insufficient to render separate pieces of amber adhesive enough to become firmly united into a homogeneous piece under the pressure applied.

If desired, the amber may be heated separately from the mold and afterward placed therein; but the mold must be heated to an equal degree, and care must be taken to maintain the required degree of heat, so that the mold does not cool until the amber therein has been subjected to the required pressure.

I do not confine myself to the employment of any particular degree of heat in my process, as different degrees of heat will be required for softening different varieties or qualities of amber.

After the molded article has been removed from the dies any fins or portions which have been formed by being pressed out at the joints of the mold can be filed off, and the article then polished and finished in the usual manner.

By the employment of my new process a great advantage is gained, for the reason that small or waste pieces of amber, which have hitherto possessed little or no value, may be utilized to form large articles, to produce which by cutting or carving, as heretofore, would require large pieces of amber, which would be exceedingly expensive, the value of amber of a given quality being rated according to the size of the pieces, and by thus utilizing all of the small pieces and particles heretofore wasted a great saving of material can be effected, while the capability of successfully molding amber either from a single piece or a number of pieces renders it possible to also greatly economize time and labor, and thus produce a great variety of useful and ornamental articles at a greatly-reduced cost. Furthermore, as amber varies greatly in color and appearance, a quantity of small pieces of various colors can be selected and mixed together, so that the article molded therefrom will present a variegated or mottled appearance, thus rendering it more beautiful.

What I claim as my invention, and desire to secure by Letters Patent, is—

1. Molding amber under the application of heat and pressure combined, substantially as set forth.

2. The process of molding or shaping amber which consists in heating the same to the necessary degree to soften it, and then applying pressure thereto while in a heated state within the mold, substantially as described.

Witness my hand this 17th day of May, A. D. 1880.

ABBOT R. DAVIS.

In presence of—
RICHD. L. H. FINCH,
CHARLES H. MESSER.